United States Patent [19]
Whitney

[11] Patent Number: 5,999,317
[45] Date of Patent: Dec. 7, 1999

[54] TOY MIRROR WITH TRANSMISSIVE IMAGE MODE

[75] Inventor: Leland R. Whitney, St. Paul, Minn.

[73] Assignee: 3M Innovative Properties Company, St. Paul, Minn.

[21] Appl. No.: 09/006,326

[22] Filed: Jan. 13, 1998

[51] Int. Cl.[6] .............................. G02B 5/30; G09F 13/00; A63H 33/22
[52] U.S. Cl. ........................ 359/501; 359/483; 359/900; 362/19; 40/434; 40/900; 446/219
[58] Field of Search ..................................... 359/487, 500, 359/501, 839, 483, 485, 489, 493, 502, 900; 40/434, 900; 446/219, 485; 472/58, 63; 362/19, 135, 141; 351/49

[56] References Cited

U.S. PATENT DOCUMENTS

| | | | |
|---|---|---|---|
| H1154 | 3/1993 | Gibson et al. | 359/501 |
| 540,768 | 6/1895 | Western | 40/477 |
| 1,475,430 | 11/1923 | Curwen | 40/454 |
| 2,535,781 | 12/1950 | Burchell | 359/489 |
| 2,763,078 | 9/1956 | Graves | 40/130 |
| 3,054,204 | 9/1962 | Yates | 40/106.52 |
| 3,100,418 | 8/1963 | Posner | 359/497 |
| 3,124,639 | 3/1964 | Kahn | 359/488 |
| 3,162,008 | 12/1964 | Berger et al. | 368/80 |
| 3,315,391 | 4/1967 | Lane et al. | 40/106.52 |
| 3,350,803 | 11/1967 | Stockwell | 40/106.52 |
| 3,535,805 | 10/1970 | Peiperl | 40/106.21 |
| 3,609,003 | 9/1971 | Siksi | 359/489 |
| 3,610,729 | 10/1971 | Rogers | 359/488 |
| 3,711,376 | 1/1973 | Alfrey, Jr. et al. | 359/359 |
| 3,711,182 | 1/1973 | Jasgur | 359/493 |
| 3,743,381 | 7/1973 | Moodie | 359/501 |
| 3,841,730 | 10/1974 | Karelitz | 359/617 |
| 3,860,036 | 1/1975 | Newman, Jr. | 138/45 |
| 3,944,346 | 3/1976 | Shindler | 359/501 |
| 4,402,510 | 9/1983 | Yokoi | 359/501 |
| 4,446,305 | 5/1984 | Rogers et al. | 528/348 |
| 4,491,326 | 1/1985 | Halsey, III | 359/501 |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,579,426 | 4/1986 | Onufry | 359/501 |
| 4,653,843 | 3/1987 | Karelitz | 359/501 |
| 4,697,890 | 10/1987 | Crookston | 359/501 |
| 4,720,426 | 1/1988 | Englert et al. | 428/344 |
| 5,122,890 | 6/1992 | Makow | 349/96 |
| 5,188,760 | 2/1993 | Hikmet et al. | 252/299.01 |
| 5,211,878 | 5/1993 | Reiffenrath et al. | 252/299.63 |

(List continued on next page.)

FOREIGN PATENT DOCUMENTS

| | | | |
|---|---|---|---|
| 1 023 998 | 2/1958 | Germany. | |
| 888050 | 12/1981 | Russian Federation | 359/501 |
| WO 95/17303 | 6/1995 | WIPO | B32B 7/02 |
| WO 95/17691 | 6/1995 | WIPO | G02B 5/30 |
| WO 95/17692 | 6/1995 | WIPO | G02B 5/30 |
| WO 95/17699 | 6/1995 | WIPO | G02F 1/1335 |
| WO 95/27919 | 10/1995 | WIPO | G02B 27/28 |
| WO 96/19347 | 6/1996 | WIPO | B32B 7/02 |
| WO 97/01440 | 1/1997 | WIPO | B32B 27/36 |
| WO 97/01774 | 1/1997 | WIPO | G02B 1/10 |
| WO 97/32226 | 9/1997 | WIPO | G02B 5/30 |

OTHER PUBLICATIONS

3M Product Brochure, "3M™ Dual Brightness Enhancement Film (DBEF)", 75–0500–2062–9, Copyright 3M, 1996.
Schrenk et al., Nanolayer polymeric optical films, Tappi Journal, pp. 169–174, Jun., 1992.

*Primary Examiner*—Cassandra Spyrou
*Assistant Examiner*—John Juba, Jr.
*Attorney, Agent, or Firm*—Gregory D. Allen

[57] ABSTRACT

Toy or novelty including a first polarizer and a second polarizer movable relative to the first polarizer. In a first mode, the first and second polarizers interact to be reflective, and in a second mode, the first and second polarizers is transmissive. The toy may further include an object or image located adjacent the second polarizer, wherein the object or image is viewable through the first and second polarizers in the second mode.

34 Claims, 8 Drawing Sheets

U.S. PATENT DOCUMENTS

| | | | |
|---|---|---|---|
| 5,228,879 | 7/1993 | Fromm | 446/219 |
| 5,235,443 | 8/1993 | Barnik et al. | 359/37 |
| 5,260,827 | 11/1993 | Dziekan | 359/501 |
| 5,269,995 | 12/1993 | Ramanathan et al. | 264/171 |
| 5,294,657 | 3/1994 | Melendy et al. | 524/270 |
| 5,316,703 | 5/1994 | Schrenk | 264/1.3 |
| 5,319,478 | 6/1994 | Fijnfschilling et al. | 349/181 |
| 5,337,224 | 8/1994 | Field et al. | 362/84 |
| 5,389,324 | 2/1995 | Lewis et al. | 264/171 |
| 5,448,404 | 9/1995 | Schrenk et al. | 359/584 |
| 5,486,935 | 1/1996 | Kalmanash | 349/194 |
| 5,486,949 | 1/1996 | Schrenk et al. | 359/498 |
| 5,612,820 | 3/1997 | Schrenk et al. | 359/498 |
| 5,629,055 | 5/1997 | Revol et al. | 428/1 |
| 5,686,979 | 11/1997 | Weber et al. | 349/96 |
| 5,699,188 | 12/1997 | Gilbert et al. | 359/584 |
| 5,721,603 | 2/1998 | De Vaan et al. | 349/194 |
| 5,744,534 | 4/1998 | Ishiharada et al. | 524/442 |
| 5,751,388 | 5/1998 | Larson | 349/96 |
| 5,767,935 | 6/1998 | Ueda et al. | 349/112 |
| 5,770,306 | 6/1998 | Suzuki et al. | 428/328 |
| 5,783,120 | 7/1998 | Ouderkirk et al. | 264/134 |
| 5,793,456 | 8/1998 | Broer et al. | 349/98 |
| 5,808,794 | 9/1998 | Weber et al. | 359/487 |
| 5,825,542 | 10/1998 | Cobb, Jr. et al. | 359/487 |
| 5,825,543 | 10/1998 | Ouderkirk et al. | 359/494 |

TOY MIRROR WITH TRANSMISSIVE IMAGE MODE

FIELD OF THE INVENTION

The present invention relates to a toy or novelty mirror having a reflective (mirror) mode and a transmissive mode.

BACKGROUND OF THE INVENTION

Conventional mirrors which are, typically, a transparent material (e.g., glass) with a pigmented or silvered coating on one side thereof, or a polished or metalized surface, operate to reflect an object or image. Such mirrors allow an observer to see a reflected image in the mirror, but block the observer from seeing an object or image located behind the mirror or mirrored surface.

Variations of conventional mirrors include "one-way" mirrors, wherein a polarized film is used to allow a person located on one side of the mirror to see a reflected image, and a person located on an opposite side of the mirror to see through the mirrored surface. A common application of this type of mirror is a pair of "mirror" sunglasses.

In the toy industry, mirrors are used, for example, in "make believe" applications, such as a child or doll make-up or mirror set. Further, some children's stories utilize mirrors to "show" images of characters other than the person looking into the mirror, such as a king or queen, princess, a monster, or ghost.

SUMMARY OF THE INVENTION

The present invention provides a toy mirror (including novelty mirrors) with a transmissive mode. The toy mirror operates as a reflective mirror in a first mode, allowing an observer to view a reflected image, and a second transmissive mode allowing the observer in the same position to view an object (including an image).

In one exemplary embodiment, the present invention comprises a toy which includes a first polarizer and a second polarizer which is movable from a first orientation to a second orientation relative to the first polarizer. In a first mode, wherein when the first polarizer and the second polarizer are in the first orientation, the first polarizer and second polarizer collectively interact to be reflective; and in a second mode, wherein when the first and second polarizer are in the second orientation, the first and second polarizers are transmissive (preferably transparent).

A toy according to the present invention may further include a toy housing. Preferably, the first polarizer has a fixed position relative to the toy housing, and the second polarizer is movable (preferably, rotatable, more preferably, rotatable through at least a range of 90°) relative to the first polarizer. The first polarizer and/or second polarizer is optionally a multi-layer birefringent film.

A toy according to the present invention may further include an object to be viewed, wherein the object can be fixed relative to the first polarizer. Such object is not viewable when the toy is in the first mode, but is viewable when the toy is in the second mode. The object is optionally an image located in and/or on a translucent (optionally transparent) material. It is also recognized that the object can be an article.

The first polarizer is optionally located adjacent the second polarizer. The toy may further include a generally transparent sheet material including an image located thereon. The generally transparent sheet material is optionally located adjacent the second polarizer. Preferably, the generally transparent sheet material may be in a fixed position relative to the first polarizer.

The first polarizer may include an optical axis extending therethrough, wherein the second polarizer is movable relative to the first polarizer optical axis by rotating the second polarizer about a center axis. In one embodiment, the second polarizer is rotated through a range of about 90°(or a complimentary range of about 270°) from the reflective mode to the transmissive mode.

In another aspect, a light source (e.g., natural light (i.e., the sun) or artificial light source) is optionally located adjacent the generally transparent sheet material. In one embodiment, the light source is a layer of electroluminescent sheet device coupled to a power source.

In another exemplary embodiment, a toy according to the present invention has a reflective mode and a transmissive mode, and includes a toy assembly, wherein the toy assembly includes a first polarizer including a polarizing direction, an optical axis generally perpendicular to the first polarizer, and a second polarizer including a polarizing direction, wherein the second polarizer is movable relative to the optical axis for changing the toy assembly between a transmissive mode and a reflective mode. In the reflective mode, the toy assembly is in optical alignment along the optical axis. Optionally, a mechanism is coupled to the second polarizer for changing the toy between the reflective mode and the transmissive mode.

In another embodiment, the present invention is a toy mirror including a transmissive mode for viewing an image. The toy mirror includes a mirror frame, and a first polarizer including a polarizing direction and a fixed position relative to the mirror frame, and a second polarizer including a polarizing direction, wherein the second polarizer is rotatable about a center axis relative to the first polarizer for changing the toy between a reflective mode and a transmissive mode. Further, there is a generally transparent sheet material wherein the generally transparent sheet material includes at least one of an image located therein or thereon. When the toy mirror is in the reflective mode, the toy mirror operates as a mirror, and when the toy mirror is in the transmissive mode, the image is viewable through the first polarizer and the second polarizer. The first polarizer is located immediately adjacent the second polarizer when the mirror is in the reflective mode.

In another aspect, toy mirrors in accordance with the present invention may further include a mechanism coupled to the second polarizer for moving the second polarizer relative to the first polarizer, for moving the toy mirror between the reflective mode and the transmissive mode. Further, a light source is optionally located adjacent the generally transparent sheet material. The light source is optionally natural light.

In one exemplary embodiment, when the toy mirror in accordance with the present invention is in the reflective mode, the first polarizer's polarizing direction is crossed (or generally perpendicular) relative to the second polarizer's polarizing direction, and wherein when the toy mirror is in the transmissive mode, the first polarizer's polarizing direction is in alignment (or generally parallel) with the second polarizer's polarizing direction.

BRIEF DESCRIPTION OF THE DRAWING

The accompanying drawing is included to provide a further understanding of the present invention and are incorporated in and constitute a part of this specification. The drawing illustrates exemplary embodiments of the present invention and together with the description serve to further explain the principles of the invention. Other aspects of the present invention and many of the attendant advantages of the present invention will be readily appreciated as the same becomes better understood by reference to the following Detailed Description when considered in connection with the accompanying drawing, and wherein.

DETAILED DESCRIPTION

Figure 1:
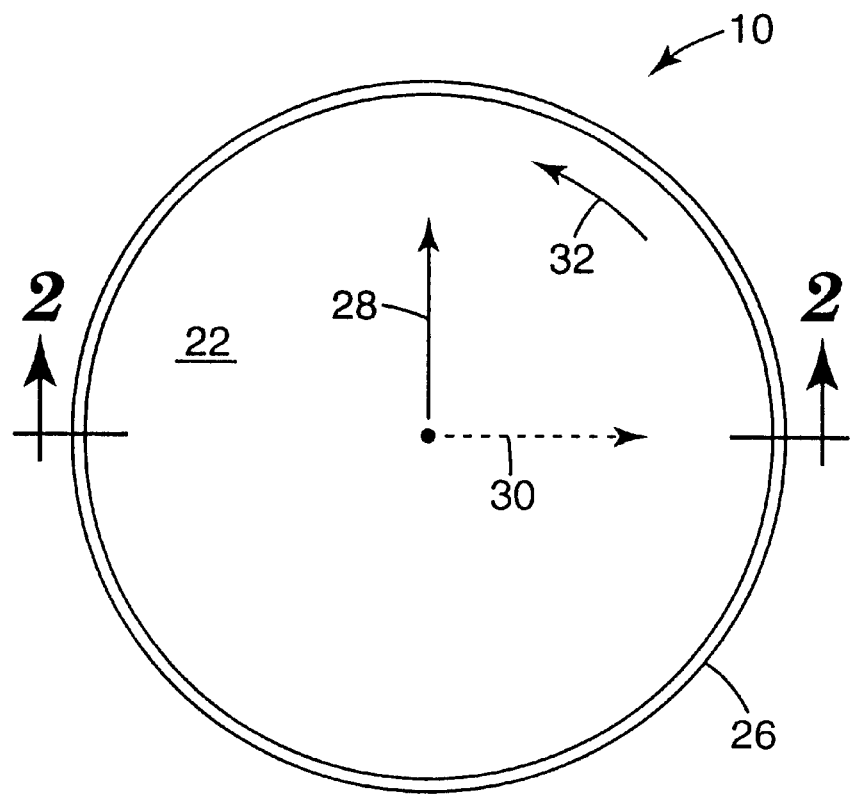
FIG. 1 is a top view illustrating an exemplary mirror assembly in accordence with the present invention.

Referring to FIG. 1, mirror assembly in accordance with the present invention 20 has a reflective mode and a transmissive mode. In the reflective mode, mirror assembly 20 operates as a mirror for reflecting an image presented in front thereof (i.e., in front of mirror assembly 20). In the transmissive mode, mirror assembly 20 operates to allow an observer generally positioned in front of mirror assembly 20 to view an object through mirror assembly 20.

Mirror assembly 20 includes first polarizer 22, second polarizer 24 (located behind first polarizer 22), and frame 26, wherein first polarizer 22 and second polarizer 24 are coupled to frame 26. Second polarizer 24 is maintained by frame 26 such that it is movable relative to first polarizer 22. By moving second polarizer 24 relative to first polarizer 22, mirror assembly 20 is changeable between the reflective mode and the transmissive mode.

First polarizer 22 has a polarizing direction 28 and second polarizer 24 has a polarizing direction 30. Second polarizer 24 is optionally located below first polarizer 22. In one aspect, second polarizer 24 can be rotated relative to first polarizer 22 until a desired degree of reflectivity is achieved. As second polarizer 24 is rotated relative to first polarizer 22 through a range of 360 degrees, first polarizer 22 and second polarizer 24 collectively interact to change between a transmissive mode and a reflective mode. When second polarizing direction 30 is in alignment with first polarizing direction 28 (i.e., second polarizing direction 30 is rotated 0 degrees from first polarizing direction 28) or when second polarizing direction 30 is rotated 180 degrees from first polarizing direction 28, first polarizer 22 and second polarizer 24 collectively interact to be transmissive. When second polarizing direction 30 is rotated 90 degrees or 270 degrees from first polarizing direction 28, first polarizer 22 and second polarizer 24 collectively interact to be reflective. As first polarizer 22 and second polarizer 24 move from a transmissive mode to a reflective mode, they change from being more transmissive to being more reflective.

Figure 2:
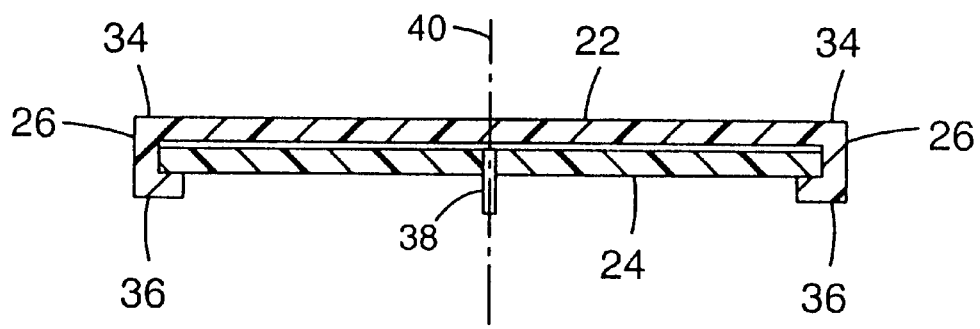
FIG. 2 is a cross-sectional view taken along line 2—2 of FIG. 1.

In FIG. 2, which is a cross-sectional view of mirror assembly 20 taken along line 2—2, frame 26 is circular shaped, having a generally U-shaped cross section. The U-shaped cross section includes first rim 34 and second rim 36. First polarizer 22 is secured (e.g., using an adhesive material) to frame 26.

Second polarizer 24 can be located immediately adjacent first polarizer 22. In one preferred embodiment, second rim 36 extends inward, forming a receiving area for selectively receiving second polarizer 24, such that second polarizer 24 is movably positioned between first polarizer 22 and second rim 36. Second rim 36 allows second polarizer 24 to be moved (e.g., rotated) relative to first polarizer 22.

Optionally, mirror assembly 20 includes mechanism 38 for moving second polarizer 24 relative to first polarizer 22. In the embodiment shown, first polarizer 22 and second polarizer 24 are generally disc shaped. Center axis 40 extends through the center of first polarizer 22 and second polarizer 24, and extends longitudinally generally perpendicular to a major surface of each of first polarizer 22 and second polarizer 24. Mechanism 38 is coupled to second polarizer 24 along center axis 40, allowing mechanism 38 to be used for rotating second polarizer 24 relative to first polarizer 22 about center axis 40.

Figure 3:
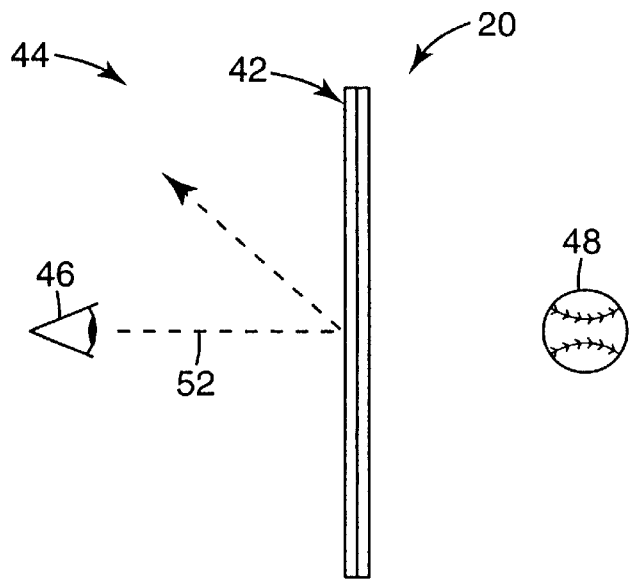
FIG. 3 is a diagram illustrating an exemplary embodiment of a mirror assembly in accordance with the present invention in a reflective mode.

In FIG. 3, a diagram illustrating operation of mirror assembly 20 in a reflective mode is generally indicated at 42. Reflective mode 42 includes observer 46, mirror assembly 20, object 48 (shown as a baseball), and light source 50. In reflective mode 42, observer 46 can only see a reflected image in the surface of mirror assembly 20, indicated by the reflected line of optical path 52. Object 48, positioned on an opposite side of mirror assembly 20, is not optically viewable by observer 46. Further, light source 50 has no, or substantially no, affect on reflected images viewed by observer 46.

Figure 4:
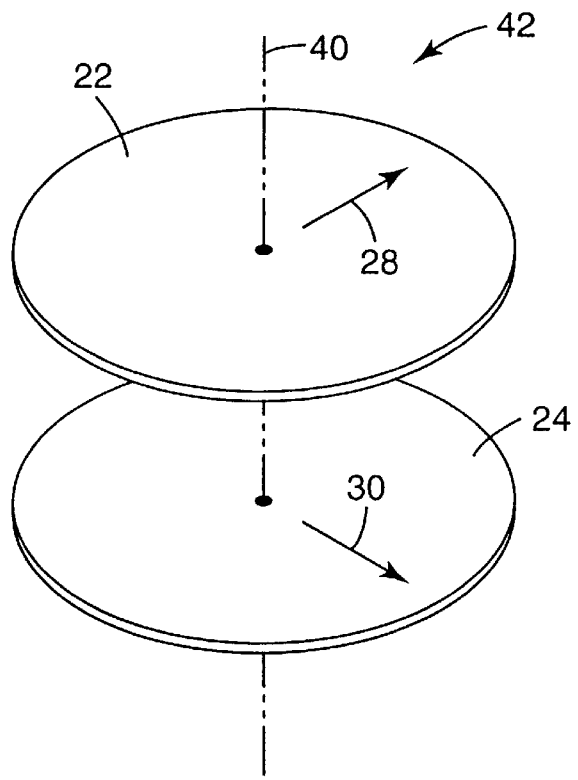
FIG. 4 is a partial perspective view of an exemplary embodiment of a mirror assembly in accordance with the present invention.

In FIG. 4, which is a perspective view illustrating the position of first polarizer 22 relative to second polarizer 24 in a first orientation to operate in reflective mode 42, second polarizer 24 having polarizing direction 30 is rotated or angularly displaced a sufficient amount to provide the desired degree of reflectivity. Preferably, the optimum degree of reflectivity is at least 90%, and most preferably through a range of at least about 90° (or 270°) relative to first polarizer 22 having polarizing direction 28, relative to their positioning along center axis 40. Since first polarizing direction 28 and second polarizing direction 30 are generally not in alignment, first polarizer 22 and second polarizer 24 interact to be reflective in reflective mode 42.

Figure 5:
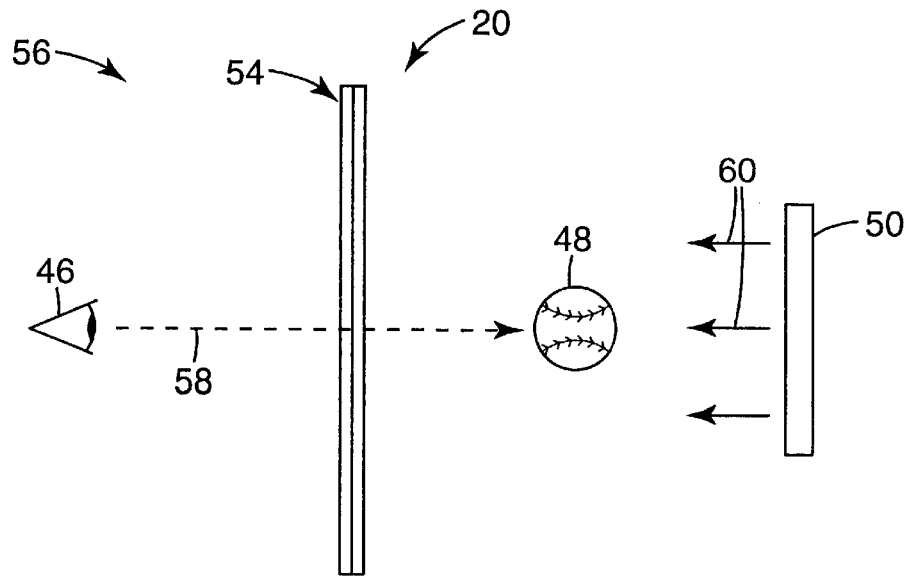
FIG. 5 is a diagram illustrating another exemplary embodiment of a mirror assembly in accordance with the present invention in a transmissive mode.

In FIG. 5, which is a diagram illustrating operation of mirror assembly 20 in transmissive mode 54, object 48 is viewable by observer 46 through mirror assembly 20, as indicated by optical path 58 shown passing through mirror assembly 20.

Although first polarizer 22 and second polarizer 24 operate in transmissive mode 54, it is recognized that first polarizer 22 and second polarizer 24 may retain some of their polarizing characteristics. As such, light source 50 may enhance the viewability of object 48 through mirror assembly 20. Optionally, light source 50 may include a reflective surface (e.g., a mirrored surface) for directing the natural and/or artificial light towards mirror assembly 20, indicated by arrows 60.

Figure 6:
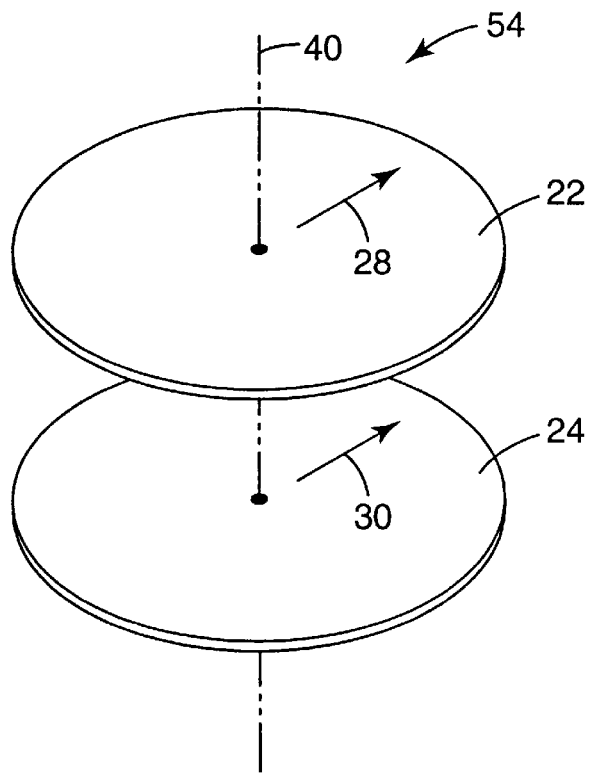
FIG. 6 is a partial perspective view illustrating another exemplary embodiment of a mirror assembly in accordance with the present invention.

Referring to FIG. 6, which is a perspective view illustrating the position of first polarizer 22 relative to second polarizer 24 in a second orientation in the transmissive mode, second polarizing direction 30 is rotated through a range of about 90° (or 270°) about center axis 40 (from the position shown in FIG. 5) into alignment with polarizing direction 28. When polarizing direction 28 is in a sufficient degree of alignment with polarizing direction 30, relative to center axis 40, first and second polarizers 22 and 24, respectively, interact to operate in the transmissive mode 54, preferably, within about 15° of alignment, and most preferably parallel. In transmissive mode 54, it is recognized that first polarizer 22 and second polarizer 24 may interact to be translucent (including transparent) such that object 48 can be seen.

Figure 7:
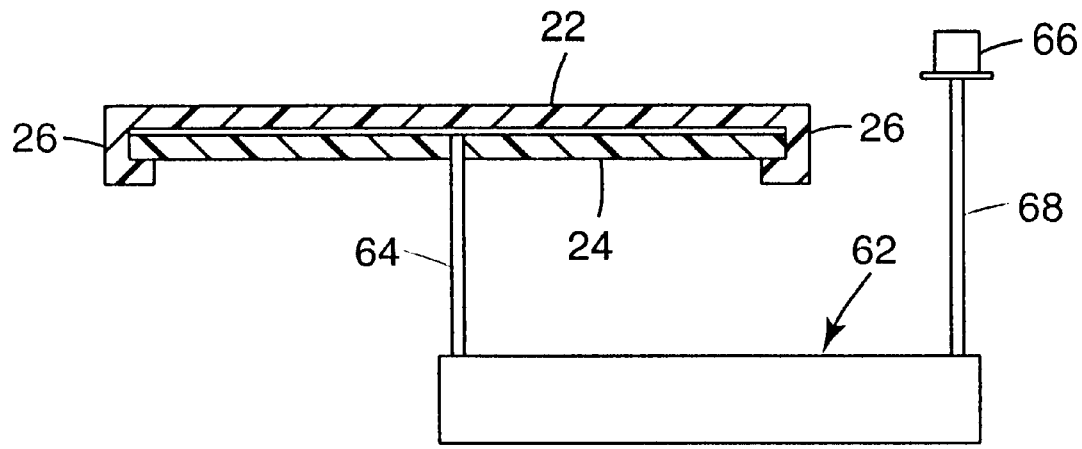
FIG. 7 is a diagram illustrating an exemplary embodiment of a mechanism for operating a mirror assembly in accordance with the present invention.

Optionally, second polarizer 24 can be moved relative to first polarizer 22, for example, mechanically, electrically or a combination of both. Referring to FIG. 7, one exemplary embodiment of mechanical operation of mirror assembly 20 utilizes mechanism 38 for rotating second polarizer 24 relative to first polarizer 22, wherein mechanism 38 includes gear box 62 mechanically coupled to second polarizer 24 through first shaft 64. Knob 66 is mechanically coupled to gear box 62 through second shaft 68. Rotational movement of knob 66 is translated along second shaft 68 through gear box 62, which in turn, rotates first shaft 64 for rotational movement of second polarizer 24 relative to first polarizer 22.

Figure 8:
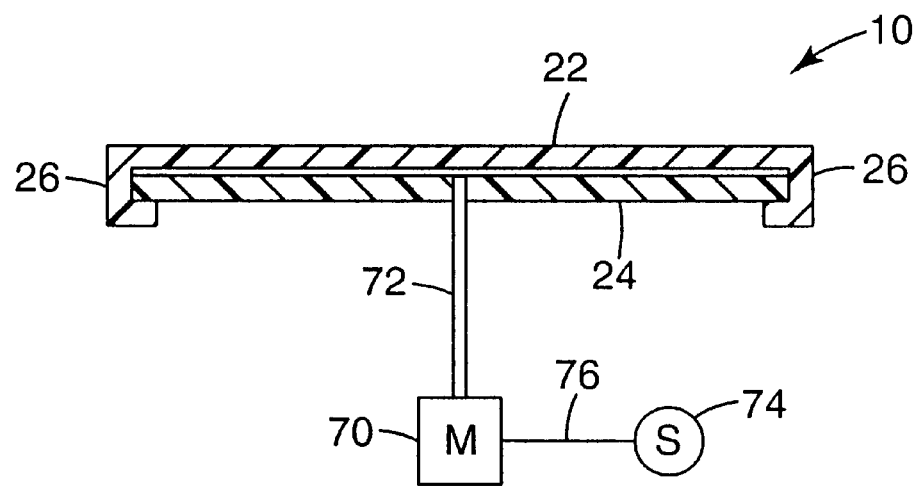
FIG. 8 is a diagram illustrating another exemplary embodiment of a mechanism for operating a mirror assembly in accordance with the present invention.

In FIG. 8, one exemplary embodiment of electrical operation of a mirror assembly 20 has second polarizer 24 coupled to motor 70 through motor shaft 72. Motor 70 is electrically coupled to switch 74, indicated at 76. By operating switch 74, motor 70 is selectively energized for rotating second polarizer 24 relative to first polarizer 22.

Figure 9:
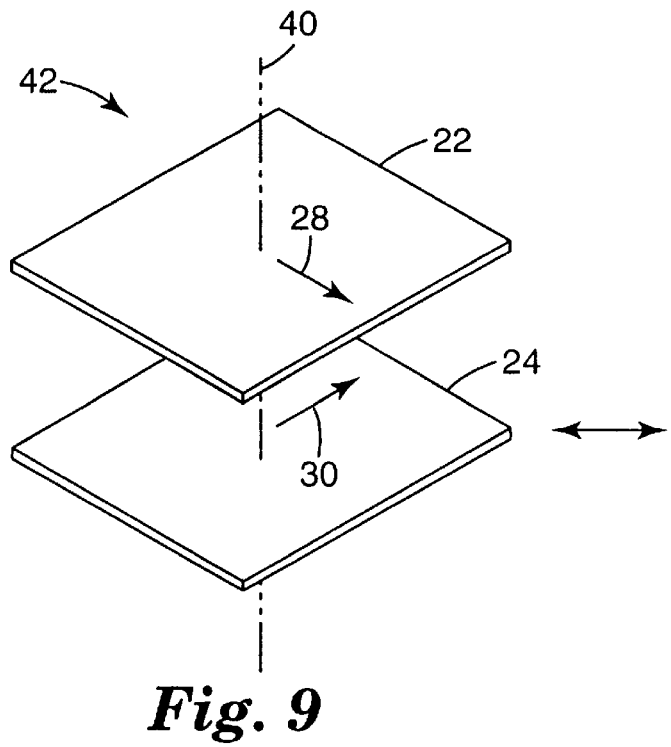
FIG. 9 is a perspective view illustrating another exemplary embodiment of movement of a mirror assembly in accordance with the present invention into a reflective mode.
Figure 10:
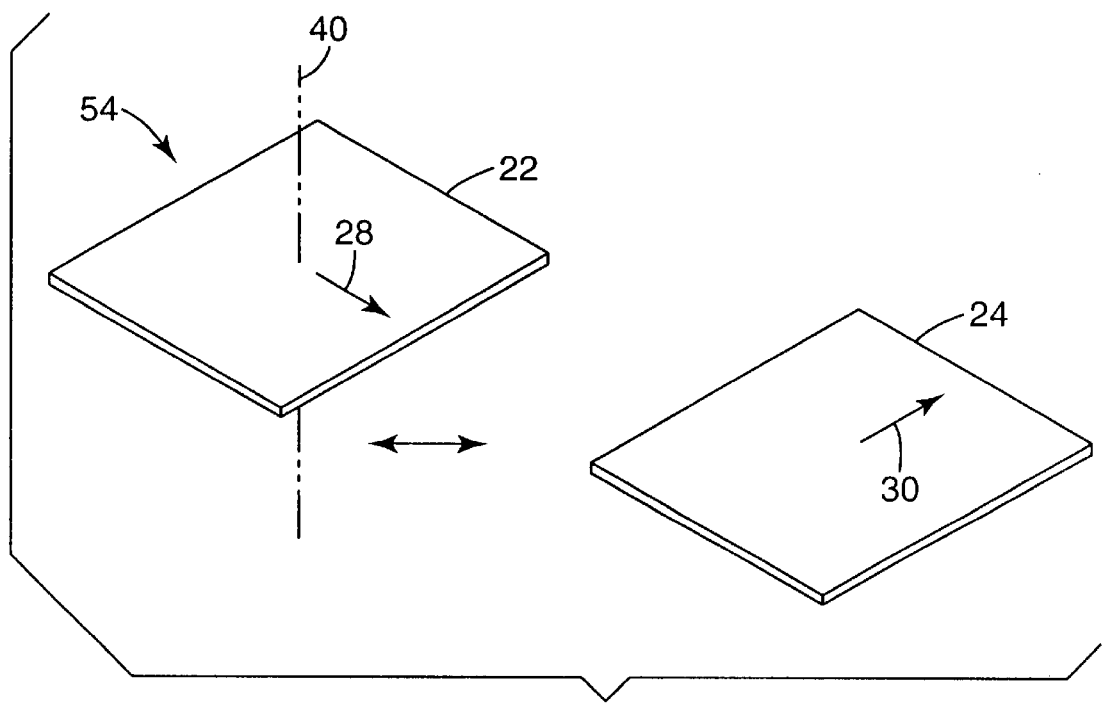
FIG. 10 is a perspective view illustrating another exemplary embodiment of movement of a mirror assembly in accordance with the present invention into a transmissive mode.

In FIG. 9 and FIG. 10, an alternative embodiment illustrating the interaction between first polarizer 22 and second polarizer 24 in reflective mode 42 and transmissive mode 54 are shown. Referring to FIG. 9, which illustrates reflective mode 42, first polarizer 22 is positioned over second polarizer 24 along center axis 40. As previously described herein, in the reflective mode, polarizing direction 28 is displaced angularly from polarizing direction 30 relative to center axis 40, such that first polarizer 22 and second polarizer 24 interact to be reflective. As shown in rectangular form, it is recognized that first polarizer 22 and second polarizer 24 may not necessarily be in the same shape. Further, first polarizer 22 and second polarizer 24 may only partially overlap.

In FIG. 10, which illustrates the transmissive mode, second polarizer 24 is laterally displaced from first polarizer 22, relative to center axis 40, such that both first polarizer 22 and second polarizer 24 are translucent such that an object is viewable therethrough.

Figure 11:
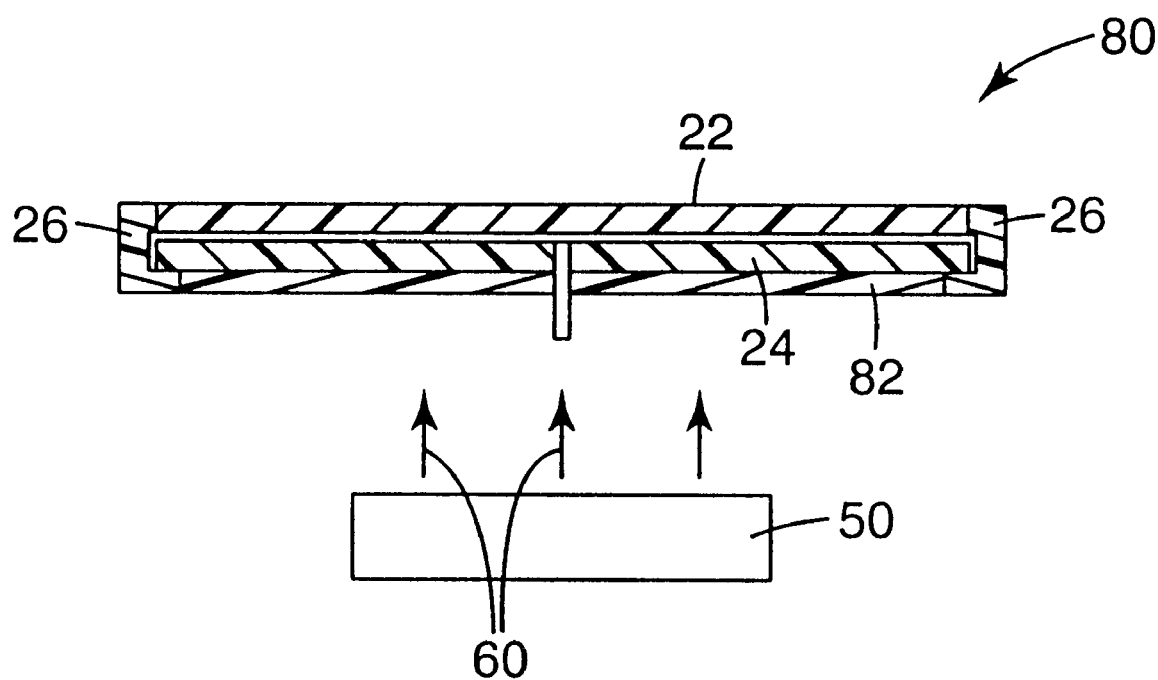
FIG. 11 is a cross-sectional view illustrating another exemplary embodiment of a mirror assembly in accordance with the present invention.

Referring to FIG. 11, which is a cross-sectional diagram illustrating another exemplary embodiment of a mirror assembly in accordance with the present invention, mirror assembly 80, which can be similar to mirror assembly 20 as previously described herein, includes image layer 82. Image layer 82 which has a fixed position relative to first polarizer 22, and is optionally secured to frame 26 has at least one of an image located therein or thereon. Optionally, image layer 82 is fixedly secured (e.g., using an adhesive material) to frame 26.

In reflective mode 42, mirror assembly 80 operates as a mirror as previously described herein. In transmissive mode 54, the image located on and/or in layer 82 is viewable through both first polarizer 22, and second polarizer 24. Further, as previously described herein, light source 50 having directed light 60 is optionally located adjacent image layer 82 for enhancing the viewability of the image when it is viewed through first polarizer 22 and second polarizer 24.

Image layer 82 can, for example, be transparent polymeric material 86 (e.g., a conventional overhead transparency). View able image 84 can be printed, for example, onto transparent polymeric material 86 using a printing technique (e.g., laser printing). Optionally, viewable image 84 can be printed directly on a major surface (e.g., the back side) of second polarizer 24.

Figure 12:
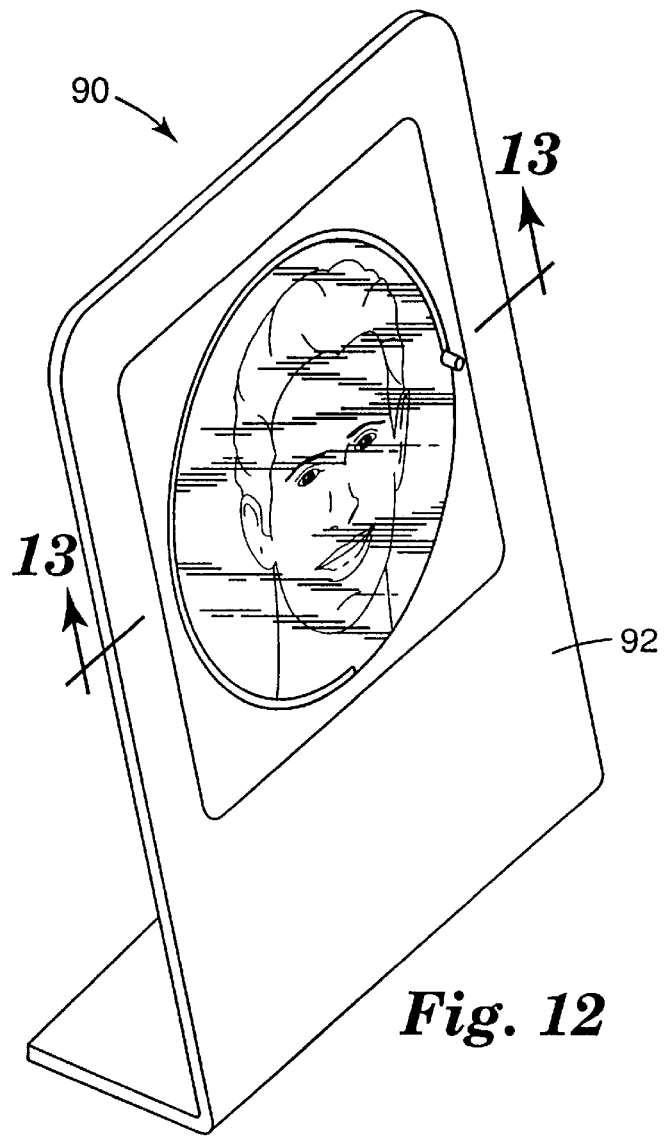
FIG. 12 is a perspective view of another exemplary embodiment of a mirror assembly in accordance with the present invention.

Referring to FIG. 12, mirror assembly in accordance with the present invention 90 can be similar to mirror assembly 20 and mirror assembly 80 as previously described herein. Toy mirror assembly 90 can be used, for example, by children in playing games, such as dress-up or dolls. In the reflective mode, toy mirror assembly 90 operates as a mirror, and in the transmissive mode, it is generally translucent such that image 91 is viewable through toy mirror assembly 90. In the reflected mode, image 91 may give the appearance of a reflected image in toy mirror assembly 90. Image 91 can be any type of viewable image, including an object, a doll face, a monster, a movie character, a famous person/character, a trademark, and/or copyrightable material. As shown, image 91 is of a man, and is viewable through toy mirror assembly 90 when it is in the transmissive mode. In another aspect, image layer 82 can be positioned between first polarizer 22 and second polarizer 24.

Optionally, toy mirror assembly 90 includes mirror frame 92. Mirror frame 92 may be configured such that it is operable as a mirror stand. Toy mirror assembly 90 includes a mechanism in the form of pin or knob 94, which can be moved within slot 96 to change toy mirror assembly 90 between the reflective mode and the transmissive mode.

Figure 13:
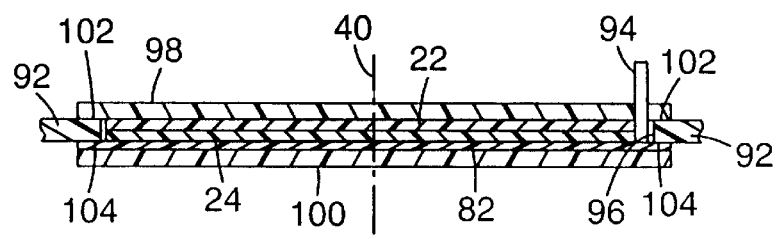
FIG. 13 is a cross-sectional view taken along line 13—13 of FIG. 12.

In FIG. 13, a cross-sectional view of toy mirror assembly 90 has first polarizer 22, second polarizer 24 and image layer 82 previously described herein, as well as first protective layer 98 and second protective layer 100. First polarizer 22 is fixedly mounted within toy mirror assembly 90; and second polarizer 24 is movably mounted. Alternatively, for example, first polarizer 22 is movably mounted within toy mirror assembly 90; and second polarizer 24 is optionally fixedly mounted.

First protective layer 98 is secured (e.g., using an adhesive material) about its outer edge to toy mirror frame 92. Similarly, first polarizer 22 is secured to bottom side 102 of first protective layer 98 using, for example, a transparent adhesive material. Image layer 82 is fixedly secured (e.g., using an adhesive material) to toy mirror frame 92 at its edges, indicated at 104. In turn, second protective layer 100 is secured (e.g., using an adhesive material) to image layer 82.

Second polarizer 24 is movably retained between first polarizer 22 and image layer 82 at its sides, and toy mirror frame 92 at its edges. Pin or knob 94, which extends from toy mirror assembly 90 through slot 96, is fixedly secured to second polarizer 24 at a point along its edge, indicated at 106, such that it can be used for rotating second polarizer 24 relative to first polarizer 22 about center axis 40, while encapsulated within the protective enclosure as defined by first protective layer 98, second protective layer 100, and toy mirror frame 92.

Figure 14:
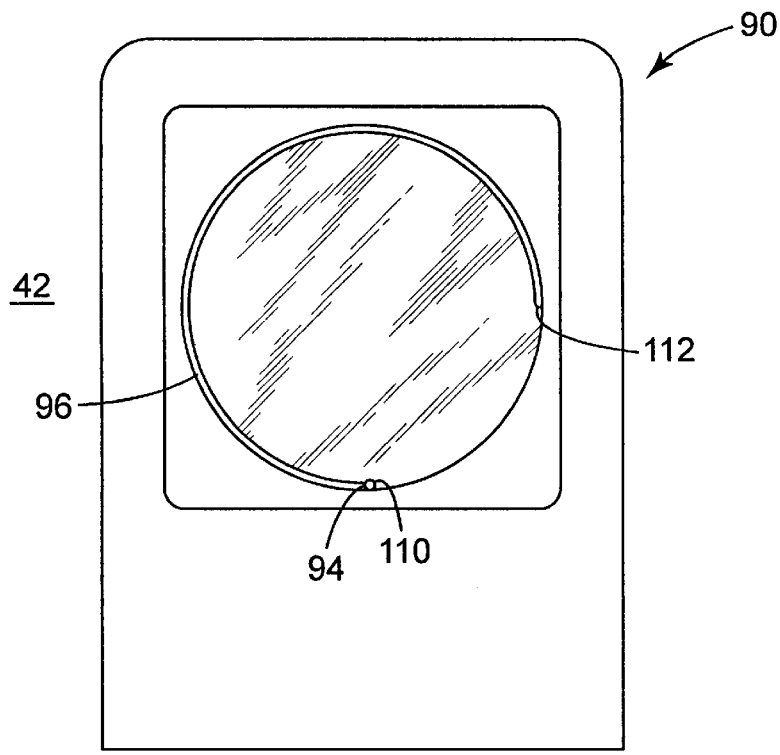
FIG. 14 is a front view illustrating the operation of the mirror assembly of FIG. 12 in a reflective mode.

In FIG. 14, toy mirror assembly 90 is shown in reflective mode 42, wherein polarizing direction 28 of first polarizer 22 is not in alignment with second polarizing direction 30 of second polarizer 24.

Figure 15:
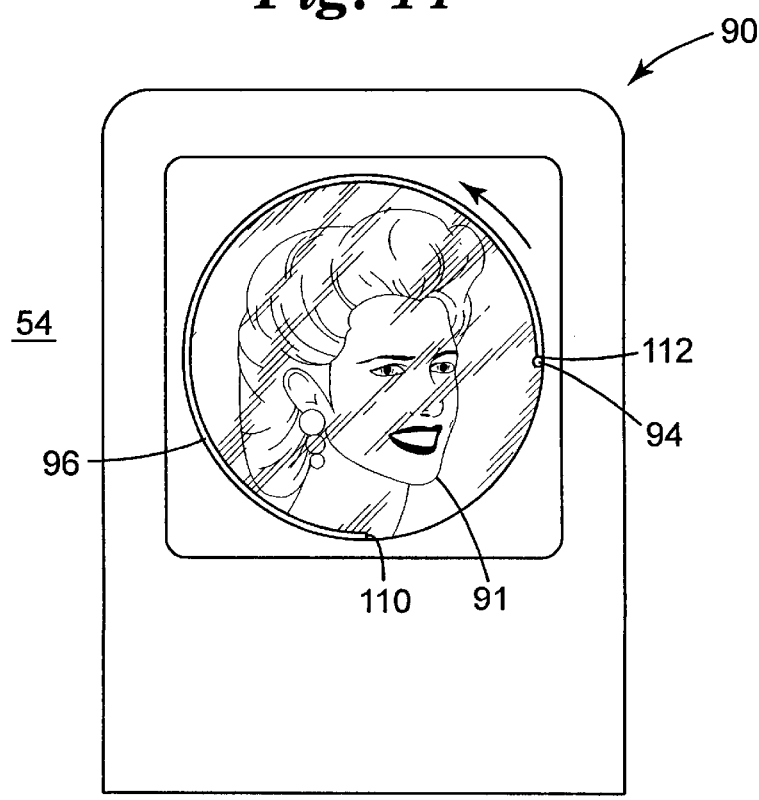
FIG. 15 is a front view illustrating the operation of the mirror assembly of FIG. 12 in a transmissive mode.

Referring to FIG. 15, which is a front view of toy mirror assembly 90 in transmissive mode 54, image layer 82 includes laser image 91 printed thereon. Pin 94 has been moved within slot 96 from first position 110 to second position 112, angularly displacing or rotating second polarizer 24 about central axis 40, 90° relative to first polarizer 22. As shown after movement of pin 94 from first position 110 to second position 112, polarizing direction 28 is in alignment with polarizing direction 30, and image 91 is viewable by an observer looking into toy mirror assembly 90.

The novel toy mirror in accordance with the present invention operates as a reflective mirror in a first mode, allowing an observer to view a reflected image, and operates in a second, transmissive mode allowing the observer in the same position to view an object (including an image) through the mirror surface. The toy mirror is useful, for example, in "make believe applications" as described herein, such as a child or doll make-up mirror set. Further, the toy mirror may be used in connection with children's stories which utilize mirrors to "show" images of characters other than the person looking into the mirror, such as a king or queen, princess, a monster, ghost, or famous person.

Components of toys according to the present invention can be made of any of a variety of materials (including those referred to herein). For example, such materials may include rigid polymeric materials for the mirror and pin or knob. Other suitable materials may also be apparent to those skilled in the art after reviewing the disclosure of the present invention.

Polarizers for use in the present invention include dichroic polarizers and multilayer optical films (see, e.g., U.S. Pat. Nos. 5,486,949 (Schrenk et al.) and 5,612,820 (Schrenk et al.)), the disclosures of which are incorporated herein by reference). Preferred polarizers for use in the present invention can be constructed with a multilayer optical film which transmit a significant amount of light having one plane of polarization while reflecting a significant amount of light having an orthogonally oriented polarization. Such multilayer optical films exhibit relatively low absorption of incident light, as well as high reflectivity for off-axis as well as normal light rays. Further, the relative percentages of transmitted/reflected light can be largely controlled by the multilayer optical film used.

Suitable birefringent optical film polarizers for practicing the present invention are also commercially available, under the trade designation "DUAL BRIGHTNESS ENHANCEMENT FILM" from the 3M Company of St. Paul, Minn.

Preferred polarizers for practicing the present invention are birefringent optical films constructed of multilayer stacks for which the Brewster angle (the angle at which reflectance of p-polarized light goes to zero) is very large or is nonexistent. This allows for the construction of multilayer polarizers whose reflectivity for p-polarized light decreases slowly with angle of incidence, are independent of angle of incidence, or increase with angle of incidence away from the normal. As a result, multilayer films having high reflectivity for the selected direction over a wide bandwidth, can be achieved. Such film can be used to prepare multilayer films having an average reflectivity of at least 50% over at least a 100 nm wide band.

Preferred polarizer film for use in the present invention are described in application having U.S. Ser. Nos. 08/402,041, filed Mar. 10, 1995; 08/494,366, filed in Jun. 26, 1995; and Ser. No. 09/066,601, filed Jan. 13, 1998, the disclosures of which are incorporated herein by reference.

Various process considerations are important in making high quality optical films (including polarizers). The process conditions used to make the film will depend in part on the particular resin system used and the desired optical properties of the final film. The following description is intended as an overview of those process considerations common to many resin systems used in making the coextruded optical films useful in the present invention.

Material Selection

Regarding the materials from which the films are to be made, there are several conditions which must be met that are common to certain preferred multilayer optical films for use in the present invention. First, such films comprise at least two distinguishable polymers. The number is not limited, and three or more polymers may be advantageously used in particular films. Second, one of the two required polymers, referred to as the "first polymer", must have a stress optical coefficient having a large absolute value. In other words, it must be capable of developing a large birefringence when stretched. Depending on the application, this birefringence may be developed between two orthogonal directions in the plane of the film, between one or more in-plane directions and the direction perpendicular to the film plane, or a combination of these. Third, the first polymer must be capable of maintaining this birefringence after stretching, so that the desired optical properties are imparted to the finished film. Fourth, the other required polymer, referred to as the "second polymer", must be chosen so that in the finished film, its refractive index, in at least one direction, differs significantly from the index of refraction of the first polymer in the same direction. Because polymeric materials are dispersive, that is, the refractive indices vary with wavelength, these conditions must be considered in terms of a spectral bandwidth of interest.

Other aspects of polymer selection depend on specific applications. For polarizing films, it is advantageous for the difference in the index of refraction of the first and second polymers in one film-plane direction to differ significantly in the finished film, while the difference in the orthogonal film-plane index is minimized. If the first polymer has a large refractive index when isotropic, and is positively birefringent (that is, its refractive index increases in the direction of stretching), the second polymer will be chosen to have a matching refractive index, after processing, in the planar direction orthogonal to the stretching direction, and a refractive index in the direction of stretching which is as low as possible. Conversely, if the first polymer has a small refractive index when isotropic, and is negatively birefringent, the second polymer will be chosen to have a matching refractive index, after processing, in the planar direction orthogonal to the stretching direction, and a refractive index in the direction of stretching which is as high as possible.

Alternatively, it is possible to select a first polymer which is positively birefringent and has an intermediate or low refractive index when isotropic, or one which is negatively birefringent and has an intermediate or high refractive index when isotropic. In these cases, the second polymer may be chosen so that, after processing, its refractive index will match that of the first polymer in either the stretching direction or the planar direction orthogonal to stretching. Further, the second polymer will be chosen such that the difference in index of refraction in the remaining planar direction is maximized, regardless of whether this is best accomplished by a very low or very high index of refraction in that direction.

One means of achieving this combination of planar index matching in one direction and mismatching in the orthogonal direction is to select a first polymer which develops significant birefringence when stretched, and a second polymer which develops little or no birefringence when stretched, and to stretch the resulting film in only one planar direction. Alternatively, the second polymer may be selected from among those which develop birefringence in the sense opposite to that of the first polymer (negative—positive or positive—negative). Another alternative method is to select both first and second polymers which are capable of developing birefringence when stretched, but to stretch in two orthogonal planar directions, selecting process conditions, such as temperatures, stretch rates, post-stretch relaxation, and the like, which result in development of unequal levels of orientation in the two stretching directions for the first polymer, and levels of orientation for the second polymer such that one in-plane index is approximately matched to that of the first polymer, and the orthogonal in-plane index is significantly mismatched to that of the first polymer. For example, conditions may be chosen such that the first polymer has a biaxially oriented character in the finished film, while the second polymer has a predominantly uniaxially oriented character in the finished film.

The foregoing is meant to be exemplary, and it will be understood that combinations of these and other techniques may be employed to achieve the polarizing film goal of index mismatch in one in-plane direction and relative index matching in the orthogonal planar direction.

Colored films can be regarded as special cases of mirror and polarizing films. Thus, the same criteria outlined above apply. The perceived color is a result of reflection or polarization over one or more specific bandwidths of the spectrum. The bandwidths over which a multilayer film of the current invention is effective will be determined primarily by the distribution of layer thicknesses employed in the optical stack(s), but consideration must also be given to the wavelength dependence, or dispersion, of the refractive indices of the first and second polymers. It will be understood that the same rules apply to the infrared and ultraviolet wavelengths as to the visible colors.

Absorbance is another consideration. For most applications, it is advantageous for neither the first polymer nor the second polymer to have any absorbance bands within the bandwidth of interest for the film in question. Thus, all incident light within the bandwidth is either reflected or transmitted. However, for some applications, it may be useful for one or both of the first and second polymer to absorb specific wavelengths, either totally or in part.

Polyethylene 2,6-naphthalate (PEN) is frequently chosen as a first polymer for films of the present invention. It has a large positive stress optical coefficient, retains birefringence effectively after stretching, and has little or no absorbance within the visible range. It also has a large index of refraction in the isotropic state. Its refractive index for polarized incident light of 550 nm wavelength increases when the plane of polarization is parallel to the stretch direction from about 1.64 to as high as about 1.9. Its birefringence can be increased by increasing its molecular orientation which, in turn, may be increased by stretching to greater stretch ratios with other stretching conditions held fixed.

Other semicrystalline naphthalene dicarboxylic polyesters are also suitable as first polymers. Polybutylene 2,6-Naphthalate (PBN) is an example. These polymers may be homopolymers or copolymers, provided that the use of comonomers does not substantially impair the stress optical coefficient or retention of birefringence after stretching. The term "PEN" herein will be understood to include copolymers of PEN meeting these restrictions. In practice, these restrictions imposes an upper limit on the comonomer content, the exact value of which will vary with the choice of comonomer(s) employed. Some compromise in these properties may be accepted, however, if comonomer incorporation results in improvement of other properties. Such properties include but are not limited to improved interlayer adhesion, lower melting point (resulting in lower extrusion temperature), better rheological matching to other polymers in the film, and advantageous shifts in the process window for stretching due to change in the glass transition temperature.

Suitable comonomers for use in PEN, PBN or the like may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Polyethylene terephthalate (PET) is another material that exhibits a significant positive stress optical coefficient, retains birefringence effectively after stretching, and has little or no absorbance within the visible range. Thus, it and its high PET-content copolymers employing comonomers listed above may also be used as first polymers in some applications of the current invention.

When a naphthalene dicarboxylic polyester such as PEN or PBN is chosen as first polymer, there are several approaches which may be taken to the selection of a second polymer. One preferred approach for some applications is to select a naphthalene dicarboxylic copolyester (coPEN) formulated so as to develop significantly less or no birefringence when stretched. This can be accomplished by choosing comonomers and their concentrations in the copolymer such that crystallizability of the coPEN is eliminated or greatly reduced. One typical formulation employs as the dicarboxylic acid or ester components dimethyl naphthalate at from about 20 mole percent to about 80 mole percent and dimethyl terephthalate or dimethyl isophthalate at from about 20 mole percent to about 80 mole percent, and employs ethylene glycol as diol component. Of course, the corresponding dicarboxylic acids may be used instead of the esters. The number of comonomers which can be employed in the formulation of a coPEN second polymer is not limited. Suitable comonomers for a coPEN second polymer include but are not limited to all of the comonomers listed above as suitable PEN comonomers, including the acid, ester, hydroxy, ether, tri- or polyfunctional, and mixed functionality types.

Often it is useful to predict the isotropic refractive index of a coPEN second polymer. A volume average of the refractive indices of the monomers to be employed has been found to be a suitable guide. Similar techniques well-known in the art can be used to estimate glass transition temperatures for coPEN second polymers from the glass transitions of the homopolymers of the monomers to be employed.

In addition, polycarbonates having a glass transition temperature compatible with that of PEN and having a refractive index similar to the isotropic refractive index of PEN are also useful as second polymers. Polyesters, copolyesters, polycarbonates, and copolycarbonates may also be fed together to an extruder and transesterified into new suitable copolymeric second polymers.

It is not required that the second polymer be a copolyester or copolycarbonate. Vinyl polymers and copolymers made from monomers such as vinyl naphthalenes, styrenes, ethylene, maleic anhydride, acrylates, acetates, and methacrylates may be employed. Condensation polymers other than polyesters and polycarbonates may also be used. Examples include: polysulfones, polyamides, polyurethanes, polyamic acids, and polyimides. Naphthalene groups and halogens such as chlorine, bromine and iodine are useful for increasing the refractive index of the second polymer to a desired level. Acrylate groups and fluorine are particularly useful in decreasing refractive index when this is desired.

It will be understood from the foregoing discussion that the choice of a second polymer is dependent not only on the intended application of the multilayer optical film in question, but also on the choice made for the first polymer, and the processing conditions employed in stretching. Suitable second polymer materials include but are not limited to polyethylene naphthalate (PEN) and isomers thereof (such as 2,6-, 1,4-, 1,5-, 2,7-, and 2,3-PEN), polyalkylene terephthalates (such as polyethylene terephthalate, polybutylene terephthalate, and poly-1,4-cyclohexanedimethylene terephthalate), other polyesters, polycarbonates, polyarylates, polyamides (such as nylon 6, nylon 11, nylon 12, nylon 4/6, nylon 6/6, nylon 6/9, nylon 6/10, nylon 6/12, and nylon 6/T), polyimides (including thermoplastic polyimides and polyacrylic imides), polyamide-imides, polyether-amides, polyetherimides, polyaryl ethers (such as polyphenylene ether and the ring-substituted polyphenylene oxides), polyarylether ketones such as polyetheretherketone ("PEEK"), aliphatic polyketones (such as copolymers and terpolymers of ethylene and/or propylene with carbon dioxide), polyphenylene sulfide, polysulfones (including polyethersulfones and polyaryl sulfones), atactic polystyrene, syndiotactic polystyrene ("sPS") and its derivatives (such as syndiotactic poly-alpha-methyl styrene and syndiotactic polydichlorostyrene), blends of any of these polystyrenes (with each other or with other polymers, such as polyphenylene oxides), copolymers of any of these polystyrenes (such as styrene-butadiene copolymers, styrene-acrylonitrile copolymers, and acrylonitrile-butadiene-styrene terpolymers), polyacrylates (such as polymethyl acrylate, polyethyl acrylate, and polybutyl acrylate), polymethacrylates (such as polymethyl methacrylate, polyethyl methacrylate, polypropyl methacrylate, and polyisobutyl methacrylate), cellulose derivatives (such as ethyl cellulose, cellulose acetate, cellulose propionate, cellulose acetate butyrate, and cellulose nitrate), polyalkylene polymers (such as polyethylene, polypropylene, polybutylene, polyisobutylene, and poly(4-methyl)pentene), fluorinated polymers and copolymers (such as polytetrafluoroethylene, polytrifluoroethylene, polyvinylidene fluoride, polyvinyl fluoride, fluorinated ethylene-propylene copolymers, perfluoroalkoxy resins, polychlorotrifluoroethylene, polyethylene-co-trifluoroethylene, polyethylene-co-chlorotrifluoroethylene), chlorinated polymers (such as polyvinylidene chloride and polyvinyl chloride), polyacrylonitrile, polyvinylacetate, polyethers (such as polyoxymethylene and polyethylene oxide), ionomeric resins, elastomers (such as polybutadiene, polyisoprene, and neoprene), silicone resins, epoxy resins, and polyurethanes.

Also suitable are copolymers, such as the copolymers of PEN discussed above as well as any other non- naphthalene group -containing copolyesters which may be formulated from the above lists of suitable polyester comonomers for PEN. In some applications, especially when PET serves as the first polymer, copolyesters based on PET and comonomers from the lists above (coPETs) are especially suitable. In addition, either first or second polymers may consist of miscible or immiscible blends of two or more of the above-described polymers or copolymers (such as blends of sPS and atactic polystyrene, or of PEN and sPS). The coPENs and coPETs described may be synthesized directly, or may be formulated as a blend of pellets where at least one component is a polymer based on naphthalene dicarboxylic acid or terephthalic acid and other components are polycarbonates or other polyesters, such as a PET, a PEN, a coPET, or a co-PEN.

Another preferred family of materials for the second polymer for some applications are the syndiotactic vinyl aromatic polymers, such as syndiotactic polystyrene. Syndiotactic vinyl aromatic polymers useful in the current invention include poly(styrene), poly(alkyl styrene)s, poly(aryl styrene)s, poly(styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly(butyl styrene). Examples of poly(aryl styrene)s include the isomers of poly(phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly(ethoxy styrene). Among these examples, particularly preferable styrene group polymers, are: polystyrene, poly(p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene.

Furthermore, comonomers may be used to make syndiotactic vinyl aromatic group copolymers. In addition to the monomers for the homopolymers listed above in defining the syndiotactic vinyl aromatic polymers group, suitable comonomers include olefin monomers (such as ethylene, propylene, butenes, pentenes, hexenes, octenes or decenes), diene monomers (such as butadiene and isoprene), and polar vinyl monomers (such as cyclic diene monomers, methyl methacrylate, maleic acid anhydride, or acrylonitrile).

The syndiotactic vinyl aromatic copolymers of the present invention may be block copolymers, random copolymers, or alternating copolymers.

The syndiotactic vinyl aromatic polymers and copolymers referred to in this invention generally have syndiotacticity of higher than 75% or more, as determined by carbon-13 nuclear magnetic resonance. Preferably, the degree of syndiotacticity is higher than 85% racemic diad, or higher than 30%, or more preferably, higher than 50%, racemic pentad.

In addition, although there are no particular restrictions regarding the molecular weight of these syndiotactic vinyl aromatic polymers and copolymers, preferably, the weight average molecular weight is greater than 10,000 and less than 1,000,000, and more preferably, greater than 50,000 and less than 800,000.

The syndiotactic vinyl aromatic polymers and copolymers may also be used in the form of polymer blends with, for instance, vinyl aromatic group polymers with atactic structures, vinyl aromatic group polymers with isotactic structures, and any other polymers that are miscible with the vinyl aromatic polymers. For example, polyphenylene ethers show good miscibility with many of the previous described vinyl aromatic group polymers.

When a polarizing film is made using a process with predominantly uniaxial stretching, particularly preferred combinations of polymers for optical layers include PEN/coPEN, PET/coPET, PEN/sPS, PET/sPS, PEN/"ESTAR," and PET/"ESTAR," where "coPEN" refers to a copolymer or blend based upon naphthalene dicarboxylic acid (as described above) and "ESTAR" refers to is a polyester or copolyester (believed to comprise cyclohexanedimethylene diol units and terephthalate units) commercially available under the trade designation "ESTAR" from Eastman Chemical Co. When a polarizing film is to be made by manipulating the process conditions of a biaxial stretching process, particularly preferred combinations of polymers for optical layers include PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol.

It is sometimes preferred for the multilayer optical films of the current invention to consist of more than two distinguishable polymers. A third or subsequent polymer might be fruitfully employed as an adhesion-promoting layer between the first polymer and the second polymer within an optical stack, as an additional component in a stack for optical purposes, as a protective boundary layer between optical stacks, as a skin layer, as a functional coating, or for any other purpose. As such, the composition of a third or subsequent polymer, if any, is not limited. Preferred multi-component constructions are described in copending application having U.S. Ser. No. 09/066,118, filed Jan. 13, 1998, the disclosure of which is incorporated by reference.

Detailed process considerations and additional layers are included in copending application having U.S. Ser. No. 09/006,288, filed Jan. 13, 1998, the disclosure of which is incorporated by reference.

Other suitable polarizing materials may be apparent to those skilled in the art, after reviewing the disclosure of the present invention.

Many adhesive materials may be used to laminate optical films and devices to another film, surface, or substrate. Such adhesive materials include pressure sensitive adhesives, hot-melt adhesives, solvent-coated adhesives, heat activated adhesives and the like. These adhesive materials preferably are optically clear, diffuse and exhibit non-hazy and non-whitening aging characteristics. Furthermore, the adhesive materials should exhibit long term stability under high heat and humidity conditions. Suitable adhesive materials may include solvent, heat, or radiation activated adhesive systems. Pressure sensitive adhesive materials are normally tacky at room temperature and can be adhered to a surface by application of light to moderate pressure.

Examples of adhesive materials, whether pressure sensitive or not and useful in the present invention include those based on general compositions of polyacrylate; polyvinyl ether; diene-containing rubbers such as natural rubber, polyisoprene, and polyisobutylene; polychloroprene; butyl rubber; butadiene-acrylonitrile polymers; thermoplastic elastomers; block copolymers such as styrene-isoprene and styrene-isoprene-styrene block copolymers, ethylene-propylene-diene polymers, and styrene-butadiene polymers; polyalphaolefins; amorphous polyolefins; silicone; ethylene-containing copolymers such as ethylene vinyl acetate, ethylacrylate, and ethylmethacrylate; polyurethanes; polyamides; polyesters; epoxies; polyvinylpyrrolidone and vinylpyrrolidone copolymers; and mixtures of the above.

Additionally, adhesive materials can contain additives such as tackifiers, plasticizers, fillers, antioxidants, stabilizers, diffusing particles, curatives, and solvents, provided they do not interfere with the optical characteristics of the devices. When additives are used they are used in quantities that are consistent with their intended use and when used to laminate an optical film to another surface, the adhesive composition and thickness are preferably selected so as not to interfere with the optical properties of the optical film. For example, when laminating additional layers to an optical film or device wherein a high degree of transmission is desired, the laminating adhesive material should be optically clear in the wavelength region that the optical film or device is designed to be transparent in.

Further, the surface(s) on which an adhesive material is applied or otherwise attached to may be primed (e.g., chemically, physical (e.g., physical treatment such as roughening), and corona) to affect the degree of attachment between the adhesive material and surface.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A toy comprising:
   a first polarizer;
   a second polarizer movable from a first orientation to a second orientation relative to the first polarizer; and
   wherein said first polarizer and second polarizer collectively interact to provide a mirror when said first and second polarizer are in said first orientation, and when said first polarizer and said second polarizer are in said second orientation, said first polarizer and said second polarizers are transmissive, such that an object is viewable therethrough.

2. The toy of claim 1, wherein in said second orientation said first polarizer and second polarizer are transparent.

3. The toy of claim 1, further comprising a housing, wherein said first polarizer has a fixed position relative to said housing.

4. The toy of claim 1, wherein said second polarizer is rotatable relative to said first polarizer.

5. The toy of claim 4, wherein said second polarizer is rotatable through a range of at least about 90° relative to said first polarizer.

6. The toy of claim 5, wherein said second polarizer is rotatable about 90° relative to said first polarizer.

7. The toy of claim 1, wherein said object is at least one of an image in a translucent material, an image on a translucent material, or a combination thereof.

8. The toy of claim 7, wherein said translucent material is a transparent sheet.

9. The toy of claim 1, wherein said object is an article.

10. The toy of claim 1, wherein said object is fixed relative to said first polarizer.

11. A toy assembly changeable from a light transmissive mode to a reflective mode, the toy assembly comprising:
    a first polarizer including a polarizing direction, and an optical axis generally perpendicular to said first polarizer; and
    a second polarizer including a polarizing direction, wherein said second polarizer is moveable relative to said optical axis from a first orientation to a second orientation, such that said toy assembly is changeable from a transmissive mode when said first and second polarizers are in the first orientation to a reflective mode, which provides a mirror, in which said polarizers are in the second orientation, and wherein, in said reflective mode, said toy assembly is in optical alignment along said optical axis.

12. The toy of claim 11, further comprising a mechanism coupled to said second polarizer for moving said toy between said reflective mode and said transmissive mode.

13. The toy of claim 11, further wherein said first polarizer is adjacent to said second polarizer.

14. The toy of claim 11, further comprising a generally transparent sheet material including an image thereon.

15. The toy of claim 14, wherein said generally transparent sheet material is adjacent to said second polarizer.

16. The toy of claim 14, further comprising a light source located adjacent to said generally transparent sheet material.

17. The toy of claim 16, wherein said light source is natural light.

18. The toy of claim 16, wherein said generally transparent sheet material is in a fixed position relative to said first polarizer.

19. The toy of claim 11, wherein said first polarizer has a central axis extending therethrough, and wherein said second polarizer is movable relative to said optical axis by rotating said second polarizer about said central axis.

20. The toy of claim 19, wherein said second polarizer is rotatable through a range of at least approximately 90°.

21. The toy of claim 11, wherein said first polarizer is a multi-layer optical film.

22. The toy of claim 21, wherein said multi-layer optical film is a birefringent film.

23. The toy of claim 21, wherein said multi-layer optical film is capable of being orientated in at least one in-plane direction by stretching said film.

24. A toy mirror having a transmissive mode for viewing an image, said toy mirror comprising:
    a mirror frame;
    a first polarizer including a polarizing direction, and having a fixed position relative to said frame;
    a second polarizer including a polarizing direction, wherein said second polarizer is rotatable about a center axis relative to said first polarizer from a first orientation to a second orientation;
    a generally transparent sheet material including an image thereon; and
    wherein when said polarizers are in said first orientation, said toy operates as a mirror, such that said image is not viewable through said first and second polarizers, and when said toy mirror is in said transmissive mode, said polarizers are in said second orientation and said image is viewable through said first and second polarizers.

25. The toy mirror of claim 24, further comprising a mechanism coupled to said second polarizer for moving said second polarizer relative to said first polarizer.

26. The toy mirror of claim 24, further comprising a light source located adjacent to said generally transparent sheet material.

27. The toy mirror of claim 24, wherein when said toy mirror is in said reflective mode, said polarizing direction of said first polarizer is crossed relative to said polarizing direction of said second polarizer, and wherein when said toy mirror is in said transmissive mode, said polarizing direction of said first polarizer is in alignment with said polarizing direction of said second polarizer.

28. The toy mirror of claim 24, wherein at least one of said first polarizer or said second polarizer is a multi-layer birefringent film.

29. A method of selectively viewing an image through a toy mirror and viewing a reflection from the toy mirror, the method comprising the steps of:

providing a toy mirror frame;

providing a first polarizer including a polarizing direction, and having a fixed position relative to said frame;

providing a second polarizer located adjacent to said first polarizer, said second polarizer including a polarizing direction;

providing a generally transparent sheet material having a fixed position relative to said first polarizer, said generally transparent sheet material having an image located thereon; and selectively moving said second polarizer relative to said first polarizer between a reflective mode in which said first polarizer and said second polarizer include a first orientation, and a transmissive image viewing mode in which said first polarizer and said second polarizer include a second orientation, wherein said reflective mode provides a mirror.

30. The method of claim 29, wherein said step of moving said first polarizer relative to said second polarizer includes rotating said second polarizer through a range of at least about 90° from said reflective mode to said transmissive image viewing mode.

31. The method of claim 29, wherein at least one of said first polarizer or said second polarizer is a multi-layer birefringent film.

32. The method of claim 29, further comprising the step of backlighting said toy mirror.

33. The method of claim 29, further comprising the steps of:

providing a support stand; and coupling said toy mirror to said support stand.

34. A toy mirror having a transmissive mode for viewing an image, said toy mirror comprising:

a mirror frame;

a first polarizer including a polarizing direction, and having a fixed position relative to said frame;

a second polarizer including a polarizing direction, wherein said second polarizer is rotatable about a center axis relative to said first polarizer from a first orientation to a second orientation;

a generally transparent sheet material including an image thereon; and wherein when said polarizers are in said first orientation, said toy operates as a mirror, such that said image is not viewable through said first and second polarizers, and when said toy mirror is in said transmissive mode, said polarizers are in said second orientation and said image is viewable through said first and second polarizers, wherein said first polarizer is located immediately adjacent to said second polarizer when said toy mirror operates as a mirror.

* * * * *

UNITED STATES PATENT AND TRADEMARK OFFICE
CERTIFICATE OF CORRECTION

PATENT NO.     : 5,999,317
DATED          : December 7, 1999
INVENTOR(S)    : Leland R. Whitney It is certified that error appears in the above-identified patent and that said Letters Patent is hereby corrected as shown below:

Column 3,
Line 10, "accordence" should read -- accordance --

Column 9,
Line 18, "mismatching" should read -- mis-matching --

Signed and Sealed this

Nineteenth Day of March, 2002

Attest:

Attesting Officer

JAMES E. ROGAN
Director of the United States Patent and Trademark Office